(12) United States Patent
Erickson et al.

(10) Patent No.: US 10,491,152 B2
(45) Date of Patent: Nov. 26, 2019

(54) TRIGGER POTENTIOMETER

(71) Applicant: Blount, Inc., Portland, OR (US)

(72) Inventors: Noah Erickson, Portland, OR (US);
Stephen Jones, Portland, OR (US);
Thomas Pitts, Portland, OR (US);
Jonathan Ziring, Portland, OR (US)

(73) Assignee: Blount, Inc., Portland, OR (US)

(*) Notice: Subject to any disclaimer, the term of this patent is extended or adjusted under 35 U.S.C. 154(b) by 0 days.

(21) Appl. No.: 15/969,730

(22) Filed: May 2, 2018

(65) Prior Publication Data

US 2018/0323740 A1 Nov. 8, 2018

Related U.S. Application Data

(60) Provisional application No. 62/500,956, filed on May 3, 2017.

(51) Int. Cl.
*E06B 9/36* (2006.01)
*H02P 29/40* (2016.01)
*B25F 5/00* (2006.01)
*B25F 5/02* (2006.01)
*G05G 1/015* (2008.04)
*H01C 10/00* (2006.01)

(52) U.S. Cl.
CPC ............ *H02P 29/40* (2016.02); *B25F 5/00* (2013.01); *B25F 5/02* (2013.01); *G05G 1/015* (2013.01); *H01C 10/00* (2013.01)

(58) Field of Classification Search
CPC ..... H02K 7/145; H02P 2006/045; H02P 6/00; H02P 6/124; H02P 29/00
See application file for complete search history.

(56) References Cited

U.S. PATENT DOCUMENTS

| 5,365,155 | A | 11/1994 | Zimmermann | |
|---|---|---|---|---|
| 2004/0041531 | A1 | 3/2004 | Chu | |
| 2006/0254785 | A1* | 11/2006 | Watanabe | B25D 16/006 173/48 |
| 2013/0255981 | A1 | 10/2013 | Noto | |
| 2015/0113815 | A1* | 4/2015 | McRoberts | B25F 5/02 30/392 |
| 2015/0115857 | A1 | 4/2015 | Sergyeyenko | |
| 2017/0120408 | A1* | 5/2017 | Reese | B25F 5/00 |

FOREIGN PATENT DOCUMENTS

| EP | 1510 299 A2 | 3/2005 |
|---|---|---|
| EP | 1825964 A1 | 8/2007 |

\* cited by examiner

*Primary Examiner* — Karen Masih
(74) *Attorney, Agent, or Firm* — Schwabe Williamson & Wyatt, P.C.

(57) ABSTRACT

An electric hand tool that includes an electric motor, an electrical position indicator for operation by a user, and a control unit for controlling power delivery from a power supply to an electric motor, based signals received from the electrical position indicator. The electrical position sensor may be coupled to a trigger operable by a user, and the electrical position sensor may be configured to detect the relative position of the trigger and to only operate in the middle of its possible range. The control unit may determine if the signals received from the electrical position indicator are out of a defined range. If the signals received from the electrical position indicator are out of a defined range, the control unit may register a fault, such as a fully open and/or fully short fault.

13 Claims, 3 Drawing Sheets

TRIGGER POTENTIOMETER

PRIOR APPLICATION

This application claims priority to U.S. Provisional Application No. 62/500,956, filed on 3 May 2017, the entirety of which is hereby incorporated by reference.

TECHNICAL FIELD

Embodiments herein relate to the field of electric tools, and, more specifically, trigger systems, devices, and methods for providing variable power to an electric motor.

BACKGROUND

Many electric devices, such as hand operated tools, include a variable speed function. An electric hand tool, for example a chain saw or a hedge trimmer, has an electric motor whose speed may be variably controlled. This variable speed function is typically operated with a trigger position indicator, such as a potentiometer, that detects the relative position of the trigger and adjusts the power supplied to an electric motor accordingly.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
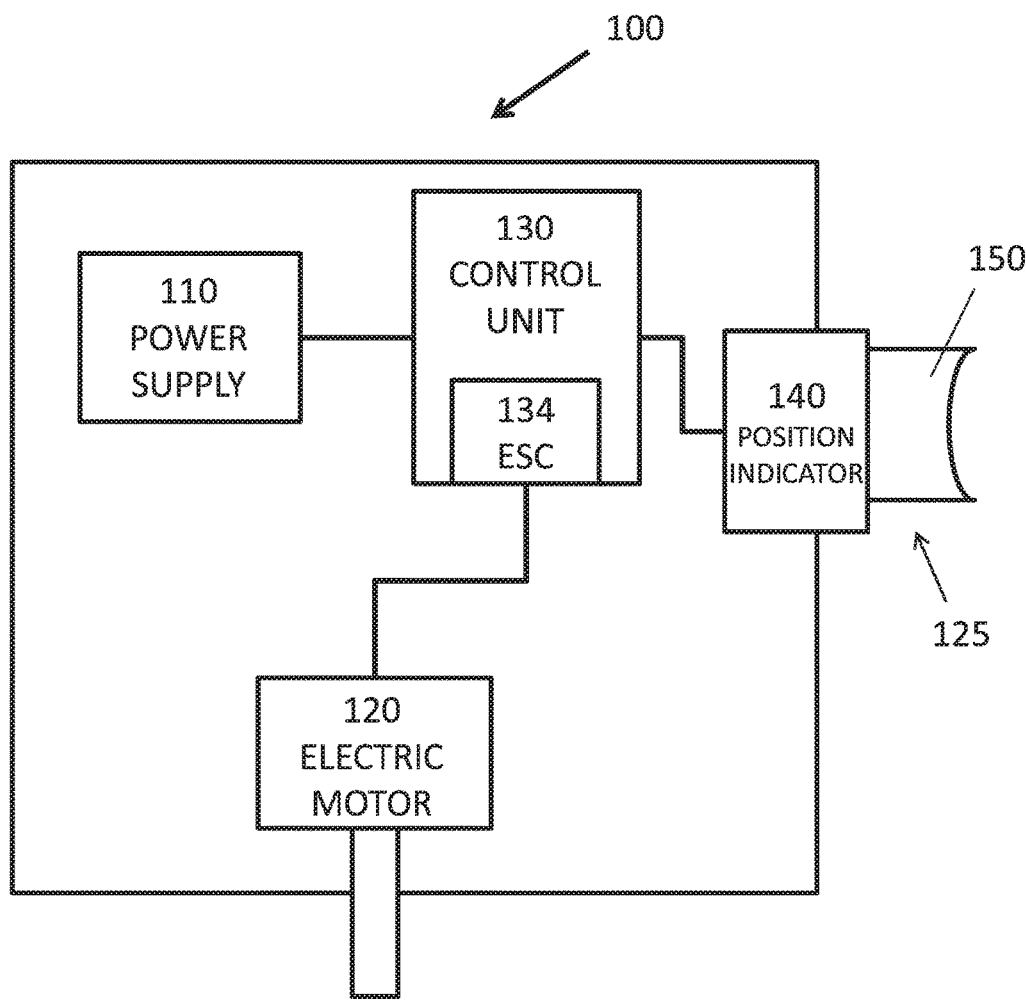
FIG. 1 is a schematic of an exemplary electronic hand tool including an electrical position indicator and a control unit, in accordance with various embodiments.

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Sensing the trigger position may implicate safety concerns with electrically powered tools. In variable speed tools, an electrical position indicator (such as a potentiometer, hall sensors, digital signal generator, or other like device) may be used to convert a physical position of a mechanical trigger into an electrical position signal, which may then be used to determine the speed at which the tool should operate. The further the trigger is advanced, the faster the tool may operate. In some embodiments, power may be routed directly through the electrical position indicator on route to an electric motor or other component of the tool. For example, the electrical position indicator may be used to indicate the trigger position to a control unit, which in turn translates the position to an electrical signal for driving the motor at the commanded speed. In other embodiments, such as where the electrical position indicator is a potentiometer, it may be sized to handle the maximum current the motor is expected to draw, and thereby control the speed of the motor by directly limiting the power delivered from the power supply.

Such electrical position indicators used in this manner have two common failure modes: fully open and fully short. While a failed indicator may be detected during quality control and testing during manufacturing, these failure modes can be difficult to detect during the useful life of the tool, as the position indicator may not provide any sign of an impending failure. When a tool that is subject to such a failure is subsequently powered, the failed electrical position indicator may cause unexpected behavior by the tool. For example, if the position indicator fails fully open, the tool may simply fail to power up regardless of trigger position, effectively resulting in a "dead" tool. Conversely, and potentially much more dangerous, is where the position indicator fails fully short. Powering up such a tool may result in the tool immediately and unexpectedly going to full power, unless the tool is equipped with other safety devices that prevent the motor from activating upon power-up.

A possible solution to address these failure modes is an electrical position indicator (for example, a potentiometer) that is configured to only operate in the middle or a predefined portion of its possible range. Because such an electrical position indicator never operates at the very top or bottom end of its possible range, a control system or unit that is configured to detect deviations in signal or indicated position from this middle range is able to determine if the signals received from the electrical position indicator are valid or, if out of the predefined range, indicative of a fault. The control unit can thus identify the two most common failure modes, namely, fully open and fully short. This ability to distinguish a fully shorted trigger (which could happen from wires being pinched during assembly, insulation breakdown, EMC noise, simple component failure, etc.) from a fully pulled trigger (or failure of the indicator) may allow more reliable indications that a tool can use to provide a reliable power-off state, and thus prevent unintended power-on safety risks.

Disclosed herein is an electric hand tool, such as a saw, hedge trimmer, pole saw, and the like. The electric hand tool may include an electric motor, an operating element such as a trigger or activation switch having an electrical position indicator (such as a sensor) for operation by a user, and a control unit for controlling the power delivered from a power supply to an electric motor based on signals received from the electrical position indicator. The electrical position indicator may be coupled to a trigger operable by a user, and the electrical position indicator may be configured to detect the relative position of the trigger, for example as it is moved by the user.

As mentioned above, in some embodiments, the electrical position indicator may directly modulate the flow of power to the motor, without need for a control unit. In other embodiments, a control unit may be separate from the electrical position indicator, and the position of the trigger determined by the electrical position indicator may be converted into an electrical control signal and passed to the control unit. In still other embodiments, the electrical position indicator may be integral with the control unit. In either case, the control unit may control the power through the electric motor on the basis of mechanical movement of the trigger as detected by the electrical position indicator. In embodiments, the electrical position indicator may be configured to only operate in the middle of its possible range. For example, the electrical position indicator may be configured to only operate between 5% to 95% of its total operating range. In embodiments, the control unit may be configured to determine if the signals received from the electrical position indicator are out of the defined range of the electrical position indicator. For example, the range may be set to detect signals that are more than 2% outside of the defined range. With reference to the diagram in FIG. 3, this may equate to a signal indicating either below approximately 500 Ohms or above approximately 8K Ohms. In embodiments, if the signals received from the electrical position indicator are out of a defined range, the control unit may be configured to register a fault, such as a fully open and/or fully short fault. The fault may be communicated to the user, for example as an audio, visual, or other alert. In still other embodiments, the control unit may require that the electrical position indicator provide an out of range signal for greater than a predetermined amount of time, to prevent possible false positive fault detections that may be due to a transient out of range signal. For example, the control unit may not register a fault unless the out of range signal is detected for greater than 1 ms, or possibly longer ranges, such as up to 10 seconds, or even longer in other implementations.

FIG. 1 is a schematic of an electronic hand tool, in accordance with various embodiments. Electronic hand tool 100 may include a power supply 110, an electric motor 120, an operating element 125, and a control unit 130. Operating element 125 may include an electrical position indicator 140 and an actuation trigger 150. Operation of the electric motor 120 may be controllable by the control unit 130, which may control the power, as may be quantified by applied voltage or voltage duty cycle, from power supply 110 to the electric motor 120. This control may depend on the position of the actuation trigger 150 as determined by the electrical position indicator 140.

In embodiments, the power supply 110 may comprise an A/C power supply, such as a cord or other means to connect tool 100 to A/C power, such as a wall socket or generator. In other embodiments, the power supply 110 may comprise a D/C power supply, such as a NiMH or Li-Ion rechargeable battery pack. Such a battery pack may be permanently coupled or installed into tool 100; in other embodiments, the battery pack may be removable and interchangeable with like-configured battery packs.

Electric motor 120 may be any motor suitable to operate within tool 100 for tool 100's intended use. Suitable motor types may include induction motors, universal motors, brushed motors, brushless motors, or any other type now known or later developed that is useful to the intended purposes of tool 100. Electric motor 120 may be supplied power via an electronic speed control (ESC) 134, which may be implemented using technology suitable for delivering and modulating power to electric motor 120 in a manner appropriate to the type of electric motor 120. The ESC 134 may be integrated into, or be a part of, control unit 130, as depicted in FIG. 1, or may be a separate, discrete component in communication or under the direction of control unit 130. In some embodiments, ESC 134 may be separate from control unit 130 while implementing at least a part of method 200, with other actions of method 200 being implemented in whole or in part by control unit 130. In various embodiments, electric motor 120 may be mechanically coupled to a driven element so as to supply power for tool 100 to perform work.

Operating element 125 may be configured to accept user actuations to control the electronic hand tool 100. In various embodiments, operating element 125 may comprise a button or actuation trigger 150 that enables the user to engage tool 100 for use, and to control its speed. Actuation trigger 150 may be configured to be moveable by a user through a range of travel, where the range of travel may correspond to a range of variable speeds through which tool 100 may be operated. For example, operating element 125 may be a trigger on a tool 100, where tool 100 may be a chainsaw, string trimmer, blower or similar implement. Initially depressing actuation trigger 150 into its range of travel may cause the electric motor 120 to power a driven element of tool 100 at a starting speed. Depressing actuation trigger 150 further into its range of travel may cause the electric motor 120 to operate at a faster speed and/or to provide additional power to an increasing load upon the driven element. Fully depressing actuation trigger 150 to the extent of its range of travel may cause the electric motor 120 to operate at full speed and/or full power. In other embodiments, actuation trigger 150 may comprise two controls, a power switch or button, and a second control for varying the power of electric motor 120. In such embodiments, the power switch or button simply toggles power, while the level of power to be delivered is determined by the position or setting of the second control. Still other embodiments may use a plurality of buttons to increase or decrease power in a step-wise fashion. Operating element 125 may be implemented in any suitable form or fashion that allows a user to both toggle power to the tool 100 as well as vary the amount of power. In some embodiments, actuation trigger 150 may be spring-loaded to automatically bias actuation trigger 150 to a low or cut-off point unless a user of tool 100 is actively depressing and applying pressure to actuation trigger 150 against the spring bias.

To facilitate the variable delivery of power, the position of actuation trigger 150 (or a similar structure) of operating element 125 within its range of motion may be sensed by electrical position indicator 140. Upon moving actuation trigger 150 of the operating element 125 by a user of the hand tool 100, electrical position indicator 140 may read the displacement of the actuation trigger 150. Depending upon its implementation in a given embodiment, actuation trigger 150 may be displaceable along one direction of movement or may be rotatable or pivotable about an axis of movement. In some embodiments, the electrical position indicator 140 may convert or encode the mechanical position of actuation trigger 150 into a control signal for input to control unit 130, to facilitate control unit 130 in controlling the power delivered by electric motor 120. In other embodiments, electrical position indicator 140 may directly modulate or control power delivery to the electric motor 120. In such embodiments, control unit 130 may simply monitor electrical position indicator 140 for out of range positions (discussed further herein) to detect a possible failure of electrical position indicator 140, and shut off power to electrical position indicator 140 in response.

The electrical position indicator 140 may be, for example, a microswitch, a spring contact, a sliding switch, a reed contact, a Hall sensor, a potentiometer, a photoelectric barrier, an encoder, or some other suitable device for reading the position of the actuation trigger 150 of the operating element 125.

In embodiments, control unit 130 may be configured to receive a signal or other indication from electrical position indicator 140 that corresponds to a physical position of actuation trigger 150. The nature of this signal may depend upon how electrical position indicator 140 is implemented, and the particular configuration of control unit 130. For example, where electrical position indicator 140 is implemented using a potentiometer, control unit 130 may be configured to sense a current or voltage passed through electrical position indicator 140. As the position of the potentiometer varies, the amount of current or voltage sensed by control unit 130 may vary, which control unit 130 may in turn use to determine a corresponding power level for electric motor 120. In other embodiments, such as where electrical position indicator 140 is implemented as an encoder, control unit 130 may receive a binary or other type of code indicative of the position sensed by electrical position indicator 140, which control unit 130 may correlate with a power level for electric motor 120. In some such embodiments, control unit 130 may utilize a look-up table or similar data structure to map encoded positions sensed by electrical position indicator 140 to a corresponding power level. It will be appreciated by a person skilled in the art that the specifics of such embodiments will depend upon how control unit 130 and electrical position indicator 140 are implemented.

In embodiments, operating element 125 may be arranged so that the full operational range of actuation trigger 150 is contained within and less than the full operable range of electrical position indicator 140, such as about 5% to 95% of the full range. For example, in implementations where actuation trigger 150 is a linear-travel spring loaded trigger, when actuation trigger 150 is at its lowest or rest position (e.g. the trigger position if spring-biased and not depressed by a user), electrical position indicator 140 will signal or encode some amount above the bottom of its operable range. Similarly, when actuation trigger 150 is at its maximum or full position (e.g. the trigger position if fully depressed), electrical position indicator 140 will signal or encode some amount below the top of its operable range. These ranges are graphically depicted in FIG. 3, which will be discussed in further detail herein.

Control unit 130 may be implemented as one or more electronic controllers, such as a microprocessor, a microcontroller, discrete circuitry, a combination of the foregoing, or some other device offering similar functionality. Some embodiments may implement some or all of control unit 130 using a field-programmable gate array (FPGA), application-specific integrated circuit (ASIC), or another similar technology. In some embodiments, control unit 130 may include a computer-readable medium such as a memory storage unit containing instructions capable of being executed by a processing unit that is part of control unit 130. Control unit 130, as depicted in FIG. 1, should be understood as a logical block, and may, in various embodiments, may be implemented by one or more discrete modules.

Control unit 130 may implement one or more actions of the operational method 200 described below with respect to FIG. 3. These actions may be implemented with respect to a given embodiment of control unit 130. For example, where control unit 130 includes a microprocessor or microcontroller, method 200 may be implemented in whole or in part using instructions capable of being executed by the microprocessor or microcontroller. For another example, where control unit 130 is implemented using discrete components or using transistor-transistor logic (TTL), such components may be arranged to implement some or all actions of method 200. For still another example, control unit 130 may use a combination of the foregoing, with some actions of method 200 implemented using a microcontroller and other actions implemented using discrete components.

Control unit 130 may be configured to accept as input a signal from electrical position indicator 140 that indicates a current position of actuation trigger 150. Depending upon a particular implementation of control unit 130, the position of actuation trigger 150 may be an analog or digital signal. Control unit 130 may accordingly be configured to convert from analog to digital, or vice versa. For example, where electrical position indicator 140 is a potentiometer (an analog device) and control unit 130 implements a digital microcontroller, control unit 130 may be equipped with an analog to digital converter to convert the sensed voltage or current from electrical position indicator 140 to a numerical value. Control unit 130 may use this numerical value to deliver to electric motor 120, in some embodiments via ESC 134, an appropriate voltage and current to drive electric motor 120 and any attached driven element to a power level corresponding to the sensed position of actuation trigger 150.

Figure 2:
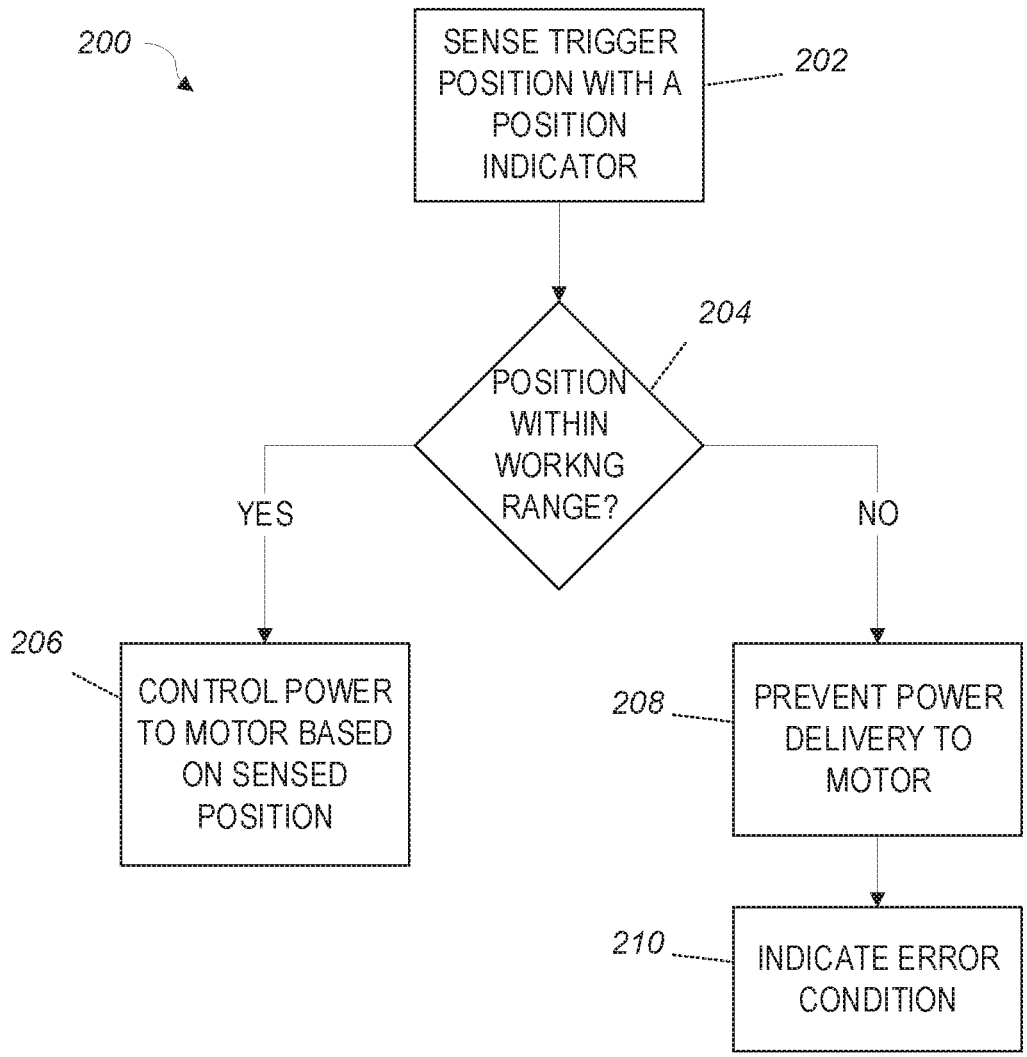
FIG. 2 is a flowchart of one possible method of controlling an electronic hand tool with an electrical position indicator that may be performed by the control unit of FIG. 1, according to various embodiments.

In FIG. 2, a method 200 of controlling the power of tool 100 that may be carried out in whole or in part by a control unit 130 is depicted. In block 202, a position of an actuation trigger 150 may be sensed by an electrical position indicator 140. As described above, both these components may be provided in an operating element 125.

The sensed position may be provided to control unit 130. In block 204, the sensed position may be evaluated for whether it is within the working range of actuation trigger 150. As discussed above, electrical position indicator 140 may be configured to have an operable range greater than the operable range of actuation trigger 150, which may be defined by physical stops that limit the physical range of actuation trigger 150. Control unit 130 may be configured to respond to the entire operable range of electrical position indicator 140, and to further determine when a sensed position received from electrical position indicator 140 is within the operable range of actuation trigger 150, or above or below the operable range of actuation trigger 150.

In block 206, if the sensed position is within the operable range of actuation trigger 150, control unit 130 may command a power level to be provided to electric motor 120 that corresponds to the sensed position of actuation trigger 150. In some embodiments, control unit 130 may either provide the appropriate power directly to electric motor 120, e.g. by using a variable power supply, pulse-width modulation, or another known technique for controlling power to an electric motor, or may signal an associated ESC 134 to supply such power. In other embodiments such as where electrical position indicator 140 directly modulates the power (e.g. it is implemented as a potentiometer), control unit 130 may simply supply power to electrical position indicator 140. The position of electrical position indicator 140 will directly control the power delivered to electric motor 120.

In block 208, however, if the sensed position is outside of the operable range of actuation trigger 150, viz. above or below the operable range of actuation trigger 150, then power may be cut off or otherwise prevented from being supplied to electric motor 120. A sensed position outside of the operable range of actuation trigger 150 may indicate a likely component failure. For example, electrical position indicator 140 may have failed in a fully open or shorted condition. Alternatively, actuation trigger 150 or any associated physical stops may have failed or broken, allowing electrical position indicator 140 to move into a position outside of the operable range of actuation trigger 150. In either event, a potentially unsafe operating condition can be detected and avoided. The control unit 130 may be configured to require that the electrical position indicator 140 provide an out of range signal for greater than a predetermined amount of time, to prevent possible false positive fault detections that may be due to a transient out of range signal. For example, control unit 130 may not register a fault unless the out of range signal is detected for greater than 1 ms, or possibly longer ranges, such as up to 10 seconds, or even longer in other implementations.

In block 210, control unit 130 or some other component may provide an alert to a user of the malfunction. For example, a warning buzzer or sound and/or visual display may be provided to the user, combined with the tool 100 being rendered inoperable. In some embodiments, control unit 130 may be configured to indicate the nature of the failure to the user to facilitate proper repairs.

Figure 3:
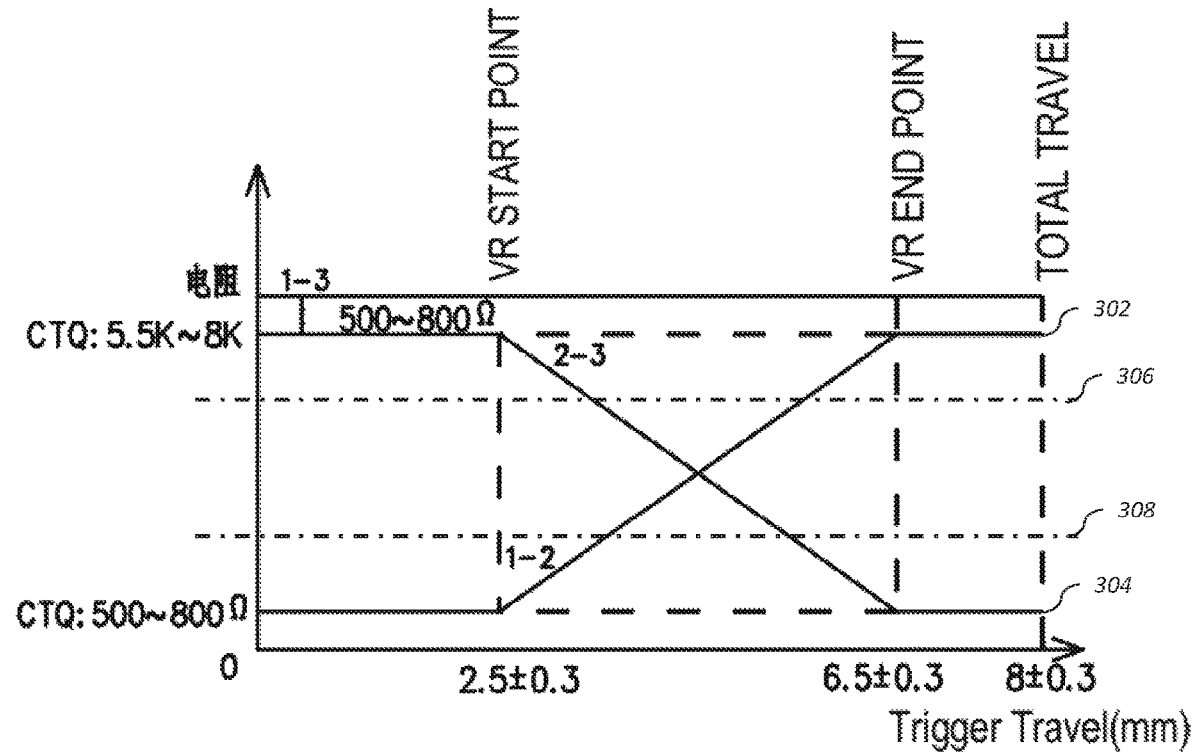
FIG. 3 is a graph depicting operable ranges as provided by an electrical position indicator, according to some embodiments.

Referring to FIG. 3, a graph of the resistance curve of an electrical position indicator 140 showing both the maximum operable range of the electrical position indicator 140 as well as the operable range of an actuation trigger 150, according to one possible embodiment, is shown. In the depicted embodiment, electrical position indicator 140 may be a potentiometer, where the resistance of the device can vary depending upon the position of the device. This variable resistance may be sensed by control unit 130 and thereby be translated into a corresponding power level to be delivered to electric motor 120. The maximum operable range of electrical position indicator 140 may be defined by a maximum resistance 302, shown as a possible range of 5.5K to 8K Ohms, and a minimum resistance 304, shown as a possible range of 500-800 Ohms. Within this maximum operable range is the operable range of actuation trigger 150, defined by a maximum operable resistance 306 and a minimum operable resistance 308. As can be seen, the maximum operable resistance 306 is less than the maximum resistance 302, and the minimum operable resistance 308 is greater than the minimum resistance 304.

The maximum operable resistance 306 and minimum operable resistance 308 may be set depending upon the nature of electrical position indicator 140, the desired range of operation of the tool 100, the potential travel of actuation trigger 150, the desired amount of fine control over tool 100, and/or the capabilities of control unit 100 of detecting variations of resistance within the operable range of actuation trigger 150, among other potential factors. It should be understood that the particular resistance values need not correlate to any specific power level, but rather may be defined according to the particular configuration of control unit 130 as well as the nature and intended use of tool 100.

In operation, any operation of actuation trigger 150 may produce a resistance that falls within maximum operable resistance 306 and minimum operable resistance 308, subject to some deviation within predefined tolerance limits. A resistance that is between maximum resistance 302 and maximum operable resistance 306, or is between minimum resistance 304 and minimum operable resistance 308, indicates a failure somewhere within tool 100, likely either with electrical position indicator 140 or with actuation trigger 150.

It should be understood that the embodiment depicted in FIG. 3 reflects an implementation of electrical position indicator 140 using a potentiometer, or similar device. While other embodiments may implement the electrical position indicator 140 using a different technology or type of device, the general principles of operable ranges depicted in FIG. 3 may still apply.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:
1. An electric hand tool, comprising:
an electrical motor;
an operating element comprising an actuation trigger and an electrical position indicator configured to read a position of the actuation trigger, the actuation trigger configured to move within a working range of the electrical position indicator that is within and less than a possible range that may be sensed by the electrical position indicator; and a control unit for controlling power delivery to the electrical motor on the basis of the position of the actuation trigger, wherein:
the electrical position indicator is configured to sense the position of the actuation trigger and provide a position signal to the control unit, and
the control unit is configured to detect when the position signal from the electrical position indicator is outside of the working range.

2. The tool of claim 1, wherein the control unit is configured to prevent power delivery to the electrical motor upon detection that the electrical position indicator is outside of the working range.

3. The tool of claim 2, wherein the control unit is further configured to provide a notification of an error condition upon detection that the electrical position indicator is outside of the working range.

4. The apparatus of claim 1, wherein the electrical position indicator is one of a microswitch, a spring contact, a sliding switch, a reed contact, a Hall effect sensor, a potentiometer, a photoelectric barrier, or an encoder.

5. The apparatus of claim 1, wherein the control unit comprises a microprocessor or microcontroller.

6. A method for controlling an electric tool, comprising:
sensing a position of an actuation trigger of the tool using an a electrical position indicator that reads the position of the actuation trigger, the actuation trigger configured to move within a working range of the electrical position indicator that is within and less than the possible range that may be sensed by the electrical position indicator;
reading, by a control unit, a position signal from the electrical position indicator; and
controlling, by the control unit, power delivery to an electrical motor in response to the position signal, wherein:
power is delivered to the electrical motor based upon the position signal of the actuation trigger when the position signal is within the working range of the electrical position indicator, the working range within the possible range that may be sensed by the electrical position indicator; and
power delivery to the electrical motor is prevented in response to the position signal indicating a position outside the working range.

7. The method of claim 6, further comprising indicating an error condition in response to the electrical position indicator indicating a position outside the working range.

8. The method of claim 6, wherein the method is performed by a control unit capable of controlling an electric hand tool.

9. A non-transitory computer readable medium (CRM), comprising instructions that, when executed by a processor of an apparatus, cause the apparatus to:
receive a position signal from an electrical position indicator configured to sense the position of an actuation trigger, the actuation trigger configured to move within a working range of the electrical position indicator;
control a speed of an electrical motor in response to the position signal when the position signal is within the working range, the working range less than the possible range that may be sensed by the electrical position indicator; and
prevent delivery of power to the electrical motor in response to the position signal outside of the working range.

10. The CRM of claim 9, wherein the instructions are further to indicate an error condition in response to the electrical position indicator indicating a position outside the working range.

11. The CRM of claim 9, wherein the apparatus comprises a control unit.

12. The CRM of claim 11, wherein the control unit comprises a microprocessor or a microcontroller.

13. The CRM of claim 9, wherein the electrical position indicator is one of a microswitch, a spring contact, a sliding switch, a reed contact, a Hall effect sensor, a potentiometer, a photoelectric barrier, or an encoder.

* * * * *